United States Patent [19]

Swinehart

[11] 4,178,948

[45] Dec. 18, 1979

[54] APPARATUS FOR USE IN CLEANING VEHICLE TIRES

[76] Inventor: Lonn L. Swinehart, 1215 Seventh St. NE., North Canton, Stark County, Ohio 44720

[21] Appl. No.: 940,444

[22] Filed: Sep. 6, 1978

[51] Int. Cl.² ............................. B08B 3/02; B60S 3/04
[52] U.S. Cl. .................................. 134/45; 15/DIG. 2; 15/53 B; 200/86 A
[58] Field of Search ............. 134/45, 123; 15/DIG. 2, 15/53 B; 200/86 A

[56] References Cited

U.S. PATENT DOCUMENTS

| | | | |
|---|---|---|---|
| 2,822,564 | 2/1958 | Crivelli | 134/45 X |
| 2,837,759 | 6/1958 | Haverberg | 15/DIG. 2 X |
| 3,241,167 | 3/1966 | Murillo et al. | 15/DIG. 2 X |
| 3,604,433 | 9/1971 | Notthoff | 134/45 |
| 3,662,417 | 5/1972 | Führing et al. | 15/DIG. 2 X |
| 3,679,134 | 7/1972 | Nixon | 134/45 X |
| 3,835,449 | 9/1974 | Viracola | 200/86 A X |
| 3,915,179 | 10/1975 | Casson | 134/45 |

Primary Examiner—Robert L. Bleutge
Attorney, Agent, or Firm—Frease & Bishop

[57] ABSTRACT

A treadleplate for use in an automatic carwash system for regulating the length of time a cleaning solution is sprayed on the tires of a passing vehicle in direct relationship to the size of the vehicle tire. A horizontal base plate is mounted on the carwash floor in the path of one of the vehicle tires. A contact plate is pivotally mounted on the base plate and is movable from a normal inclined, at-rest position to a horizontal depressed position when rolled over by the vehicle tire. The contact plate is formed with a stepped outer swinging edge which provides a series of transversely spaced contact zones of varying tire contact length. These zones are adapted to be selectively engaged by one of the tires of a vehicle moving through the carwash which depresses the contact plate and actuates a cleaning solution control valve. The particular zone which is engaged by the tire is in direct relationship to the transverse spacing or track of the particular vehicle moving through the carwash. The cleaning solution control valve is open for the exact amount of time required to properly clean the particular size tire of the passing vehicle. This valve actuation time is in direct relationship to the amount of time required for the vehicle tire to pass over the selected contact zone, which in turn in is a direct relationship to the vehicle track and tire size.

18 Claims, 9 Drawing Figures

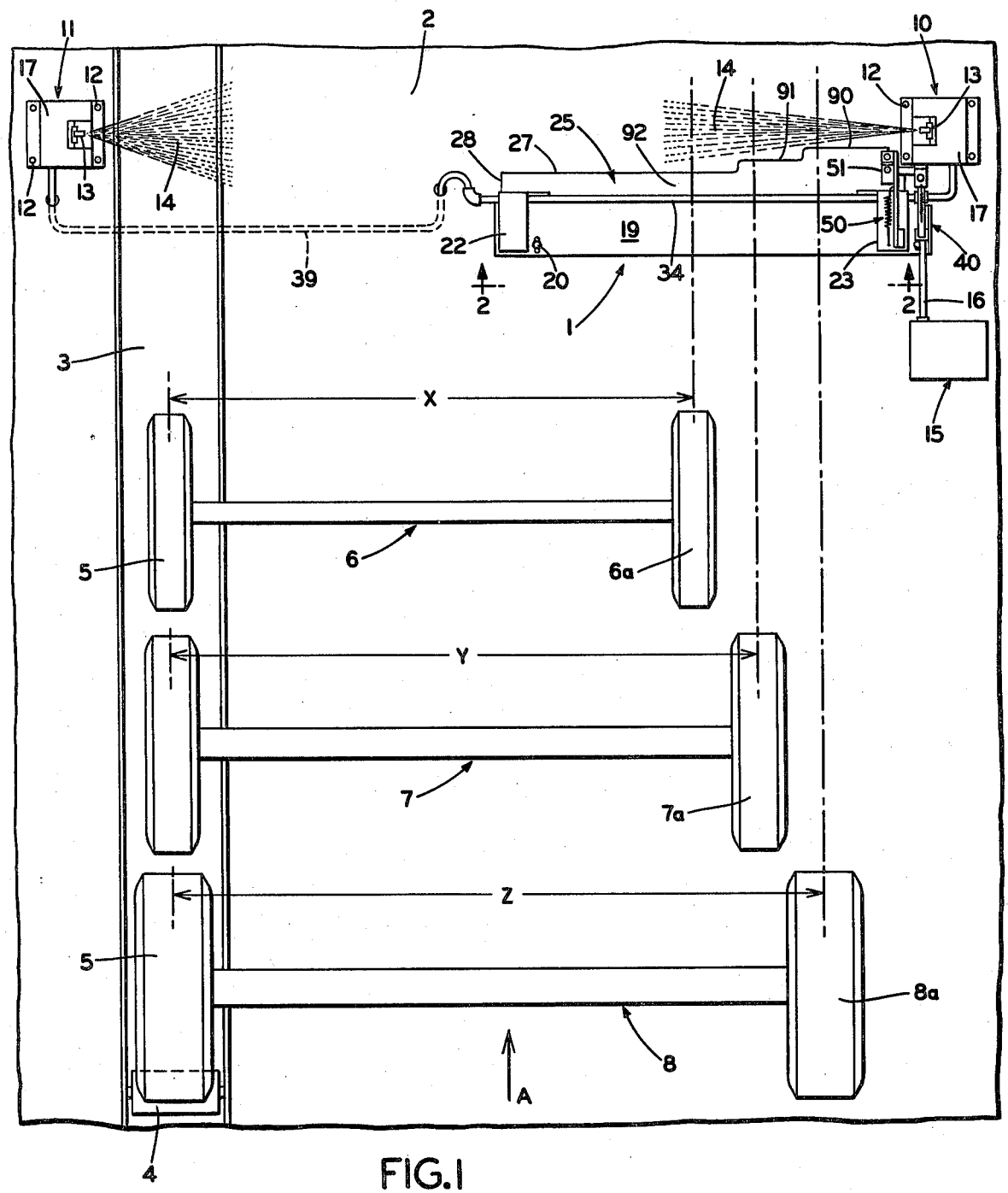
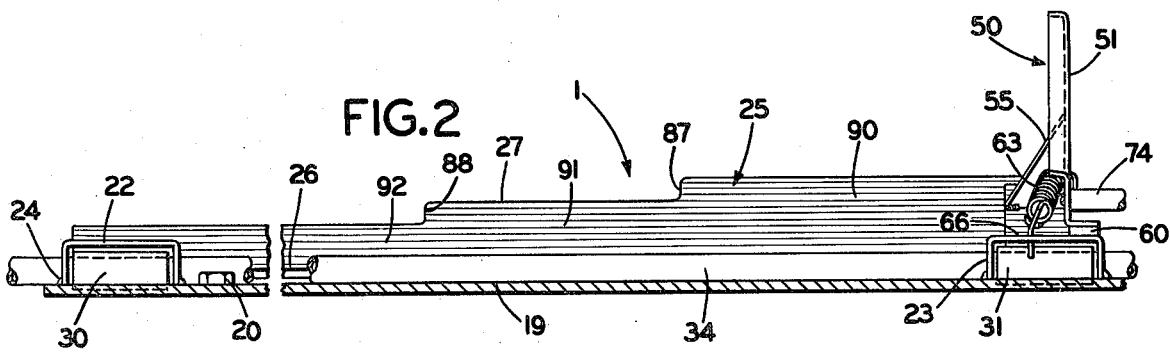

APPARATUS FOR USE IN CLEANING VEHICLE TIRES

BACKGROUND OF THE INVENTION

1. Field of the Invention

The invention relates to automatic carwash systems and particularly to equipment for economically and efficiently cleaning the tire side walls of vehicles passing through the carwash system. More particularly, the invention relates to a treadleplate construction which is depressed by one of the tires of a passing vehicle, which in turn opens a cleaning solution spray valve for a predetermined amount of time, which is in direct relationship to the size of the particular vehicle being cleaned to provide efficient and economic use of the cleaning solution while insuring complete cleaning of the vehicle tires.

2. Description of the Prior Art

In recent years automatic carwash establishments have gained significant popularity in all areas of the country. Most of these automatic carwash systems use means, such as a chain driven conveyor, to pull a vehicle at a predetermined rate of speed through a series of washing, rinsing and drying operations or stations spaced along the conveyor path. Many of these systems operate on a predetermined, programmed timing cycle which is dependent upon the speed of the moving conveyor or vehicle to perform the various cleaning operations on the vehicle as it reaches a particular cleaning station. Other types of automatic carwash systems have contact switches placed along the vehicle travel path which are depressed by the passing vehicle to actuate the particular cleaning equipment at that station. After passage of the vehicle, the initial switch is released or a second switch is depressed to deactivate the previously actuated station equipment.

At one of the stations a cleaning solution is sprayed directly against the side walls of the vehicle tires by a plurality of spray nozzles as the vehicle moves along the conveyor for cleaning the tires. The spray nozzles usually are mounted directly on the floor of the carwash or on supports located adjacent the side of the path of the vehicle tires. These nozzles are actuated for a predetermined amount of time which is sufficient to insure complete coverage and cleaning of the tire side walls.

Many of these tire cleaning spray systems are actuated in response to one of the vehicle tires passing over a treadleplate or lever located in the path of the moving vehicle. Examples of such constructions are shown in U.S. Pat. Nos. 2,837,759, 3,604,433, 3,679,134 and 3,915,179. Generally, the spray is applied during the time period required for the vehicle to pass between the initial actuating treadle lever and a second or deactivating treadle lever. In other installations, the spray nozzle is actuated the amount of time that a continuous single treadleplate is depressed by the moving tire. Another type of tire washing equipment which is actuated by a single treadleplate, moves brushes into contact with the passing tire and is shown in U.S. Pat. No. 3,662,417.

These prior and existing tire cleaning apparatus, and especially the actuating treadles therefor, have the serious disadvantage of being dependent entirely upon the speed of the vehicle moving through the carwash for controlling the spray time, or else by a predetermined constant spray cycle or time period, which is started by the passing vehicle. In either case, the spray time is constant and has no relationship to the particular size of the vehicle tire being cleaned.

Today's vehicle range from very small compact and sports car models, generally having a nominal thirteen-inch wheel size, through the intermediate vehicle class range, up to and including the large luxury-type vehicle having the nominal fifteen-inch wheel size. These different size vehicles have different size tires, and correspondingly, different size side wall areas to be cleaned. Therefore, a single predetermined spray time period will not economically and effectively clean all size vehicle tires which pass through a carwash in a random fashion.

Many automatic carwash system operators and equipment manufacturers will set the spray time period to the intermediate size vehicle tire size. With this intermediate setting, excess cleaning solution is used for the smaller cars with the resulting uneconomical operation and waste of cleaning solution. Likewise, an insufficient amount of cleaning solution is used for the larger cars resulting in poor cleaning performance and dissatisfied customers. Other settings will result in similar inefficient and/or uneconomical operation. Even though the amount of excess cleaning solution chemical which is sprayed on the smaller vehicle is relatively small per vehicle, it becomes quite substantial when multiplied by the thousands of vehicles which a usual carwash establishment will clean during a period of a year.

Therefore, the need has existed for an inexpensive apparatus for use in cleaning the side walls of the vehicle tires which accurately regulates the spray time and amount of cleaning solution applied to a passing vehicle tire in direct relationship to the size of the particular tires being cleaned. No known apparatus of which I am aware provides a solution to this problem by a relatively simple and inexpensive treadleplate construction having a stepped outer end which provides a series of contact zones of different lengths which regulate the spray application time in direct relationship to the size of the tire of the particular vehicle being cleaned.

SUMMARY OF THE INVENTION

Objectives of the invention include providing apparatus for use in cleaning vehicle tires, and in particular, a treadleplate construction which has an inclined, pivotally mounted contact plate which is adapted to be depressed by a wheel of a moving vehicle that is being washed, which in turn, actuates a cleaning solution supply valve for spraying the vehicle tires with a cleaning solution from a plurality of nozzles mounted adjacent the tire positions upon depression of the treadleplate; providing such a treadleplate construction in which the swinging end of a pivotally mounted contact plate is formed with a stepped outer edge providing a plurality of contact zones which are spaced along the length of the treadleplate in a transverse direction with respect to the path of the vehicles being cleaned, and in which each contact zone increases successively in length to provide a longer contact areas which is engaged by a vehicle tire, which in turn provides a longer valve actuation and spray application time which is in direct relationship to the length of the particular contact zone, and in which the transverse spacing and location of the contact zones are in direct relationship to the transverse spacing or track of a vehicle's wheels, whereby the larger the diameter of the vehicle's tire being cleaned, wider will be the vehicle's track, and consequently, longer will be the actuation time of the spray nozzle to insure complete cleaning of the tire without requiring excess and wasted cleaning spray solution; providing such a treadleplate construction which is formed of relatively inexpensive sheet metal plates, metal tubing and other readily available components; providing such a treadleplate construction in which a single cleaning solution control valve may be actuated by the treadleplate and regulate the amount of cleaning solution supplied to one, four, or any combination of spray nozzles for simultaneous cleaning of the vehicle wheels, and in which the cleaning solution supply line, which extends transversely across the travel path of the vehicle and connects to the spray nozzle for the opposite tire of the vehicle, forms the pivot means for the contact plate; providing such a treadleplate construction in which the pivotally mounted contact plate is spring biased to an at-rest or inclined position, thereby automatically resetting the plate for operation by a subsequent passing vehicle tire; providing such a treadleplate construction in which the associated spray nozzle control valve can be manually adjusted to regulate the valve opening for accurately controlling the amount of cleaning solution being supplied to one or more of the spray nozzles; providing a treadleplate construction for use in carwash apparatus which more economically and efficiently cleans the sidewalls of the tires than prior systems and with a more efficient power and solvent consumption; providing such a construction which is of a simple and economical design, susceptible to relatively precise automatic operation with a minimum of maintenance, which requires a minimum amount of floor space, and which can be readily installed in existing and new automatic carwash systems without interfering with other cleaning equipment and without appreciably modifying many existing treadleplates; and providing such a treadleplate construction which is sturdy and durable in use, and which eliminates difficulties heretofore encountered, achieves the objectives indicated, and solves problems and satisfies needs existing in the art.

These objectives and advantages are obtained by the apparatus for use in cleaning vehicle tires, the general nature of which may be stated as including a treadleplate construction for actuating a valve which controls the flow of a cleaning solution to one or more spray nozzles for cleaning the vehicle tires, said treadleplate having base plate means adapted to be mounted on a floor of a carwash; contact plate means pivotally mounted on the base plate means and movable from a raised position to a depressed position upon contact by a vehicle tire as the vehicle moves through the carwash; spring means biasing the contact plate means from the depressed position toward the raised position; the contact plate means having a plurality of contact zones of varying lengths adapted to be engaged by a vehicle tire; and lever means operatively engageable with the contact plate means and the spray nozzle valve for controlling the flow of cleaning solution to the spray nozzle for application to a vehicle tire for a predetermined amount of time depending upon the particular contact zone engaged by the vehicle tire.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 1 is a fragmentary, diagrammatic top plan view of the improved treadleplate construction mounted on the floor of a carwash for controlling associated vehicle tire spray equipment;

FIG. 2 is an enlarged, fragmentary front plan view of the improved treadleplate looking in the direction of arrows 2—2, FIG. 1;

Similar numerals refer to similar parts throughout the drawings.

DESCRIPTION OF THE PREFERRRED EMBODIMENT

Figure 3:
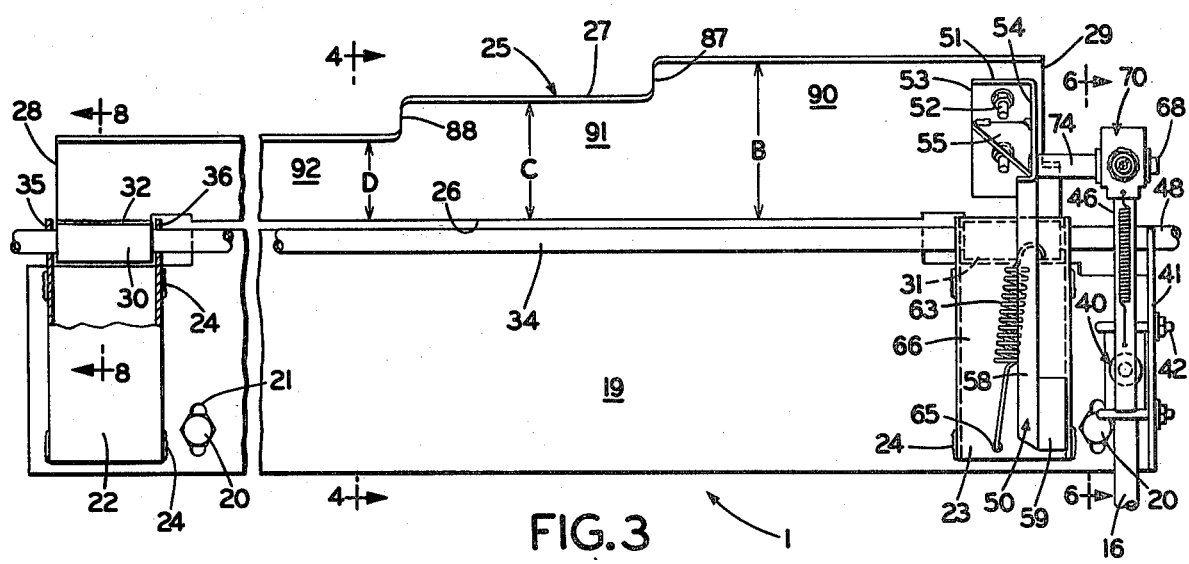
FIG. 3 is a fragmentary top plan view of the improved treadleplate shown in FIG. 1.

The improved treadleplate constructin is indicated generally at 1, shown in FIG. 1 mounted on a floor 2 of a portion of a usual automatic carwash establishment. Carwash establishments of the type in which treadleplate 1 is intended for use, usually consist of a plurality of cleaning stations spaced along a vehicle travel path. A vehicle is moved automatically through the carwash cleaning stations by various mechanisms such as a chain-driven conveyor 3. A plurality of rollers 4 are mounted on the conveyor and engage one of the rear wheels 5 of a vehicle, preferably on the driver's side.

Three rear wheel and axle assemblies, indicated generally at 6, 7 and 8, are shown diagrammatically in FIG. 1 and represent the three general vehicle tire and track sizes of most vehicles on the road today which would make use of automatic carwash establishments.

Assembly 6 represents the proportional tire size and track of the small economy and sports car class of vehicles. Assembly 7 represents the proportional tire size and track of the intermediate size or class of vehicles, with assembly 8 representing the tire and track size of the full-size or luxury class vehicles. The term "track" refers to the spacing bwtween the individual tires of the front and rear wheel pairs of these three classes of vehicles and are designed by letters X, Y and Z. The track dimension for nearly all vehicles is in direct relationship to the tire size of that particular vehicle. Therefore, the smaller or larger the vehicle tire size, the smaller or larger, respectively, will be that particular vehicle's track.

Treadleplate 1 is mounted at a predetermined position with respect to conveyor 3 for engagement by the passenger side tires 6a, 7a and 8a upon the various class vehicles reaching the tire washing station when moving through the carwash by conveyor 3 in a direction indicated by arrow A (FIG. 1). Treadleplate 1 controls a pair of spray nozzle assemblies 10 and 11 located on opposite sides of the vehicle for simultaneously cleaning the front tires and subsequently the rear tires. Alternately, treadleplate 1 can be used to control four valve assemblies by additional supply lines and two additional nozzle assemblies for simultaneously cleaning all four vehicle tires, if desired, without affecting the concept of the present invention.

Spray assemblies 10 and 11 are mounted by bolts 12 on carwash floor 2, with each assembly having a spray nozzle 13. Nozzles 13 from spray patterns 14 of a chemical cleaning solution which are directed against the side walls of the front and then rear tires of a passing vehicle. Nozzles 13 may have various spray patterns and may be mounted in various arrangements and configurations on a mounting bracket 17 located adjacent to the path of the vehicle tire. A cleaning solution supply tank and feed means, such as a compressor, indicated in combination at 15, preferably are located in the vicinity of treadleplate 1 and communicate with nozzle assemblies 10 and 11 by a primary supply line 16.

Improved treadleplate construction 1 is shown particularly in FIGS. 2 and 3. Treadleplate 1 includes a base 19 adapted to be mounted on carwash floor 2 in a generally horizontal position by a pair of bolts 20 which extend through elongated holes 21. Base 19 preferably has a rectangular configuration and is formed of a relatively rigid sheet metal plate material having a protective galvanized coating to prevent rusting from the water and harsh chemicals of a carwash.

A pair of U-shaped channels 22 and 23 are mounted in an inverted position on opposite ends of base 19 and are secured thereon by welds 24 and serve as journal blocks for the pivotal mounting of a contact plate 25.

Figure 8:
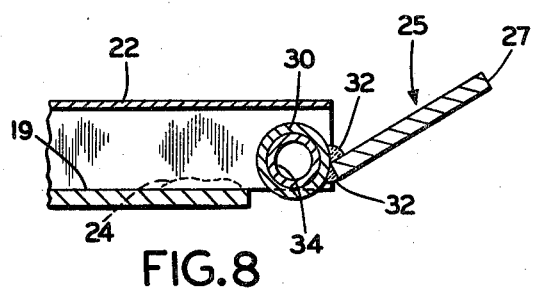
FIG. 8 is an enlarged fragmentary sectional view taken on line 8—8, FIG. 3.

Contact plate 25 has a generally rectangular configuration defined by fixed inner edge 26, swinging outer edge 27 and a pair of spaced inner and outer end edges 28 and 29. Contact plate 25 is pivotally mounted on and with respect to base 19 by a pair of sleeves 30 and 31, which are attached by welds 32 to the ends of inner plate edge 26. A section of rigid pipe 34 telescopically extends through sleeves 30 and 31 and through pairs of aligned holes 35 and 36 formed in the legs of channels 22 and 23. Contact plate sleeves 30 and 31 are located between the spaced legs of channels 22 and 23 (FIGS. 2, 3 and 8).

A valve assembly, indicated generally at 40 (FIGS. 3, 6 and 7), is mounted on a vertically extending end flange 41 by a pair of U-bolts 42. Flange 41 is formed integrally with base 19 and extends upwardly at a right angle from one end thereof. Valve assembly 40 includes a usual fluid control valve 43 of the type referred to as an "off-on" valve. Valve 43 includes a valve body 44, a plunger 45 and a lever 46. Valve 43 is in the closed or fluid "shut-off" position when lever 46 is in an at-rest or unactuated raised position, shown in FIG. 6. Downward movement of lever 46 to the position shown in FIG. 7 depresses plunger 45, moving valve 43 to an "open" position, permitting flow of a cleaning solution therethrough. Other types of valves may be used with treadleplate 1 without departing from the concept of the invention.

Incoming supply line 16 is connected to one end of valve 43 and an elbow section 47 is connected to the other end of valve 43 and connects with contact plate pivot pipe 34 and a second supply line 48 at a T-connector 49. Supply line 48 connects with nozzle assembly 10 and pivot pipe 34 connects with nozzle assembly 11 by a section of underground supply line 39 (FIG. 1).

Valve assembly 40 is operatively connected to contact plate 25 by a link assembly, indicated generally at 50 (FIGS. 2-5). Link assembly 50 includes an L-shaped member 51, one end of which is bolted to contact plate 25 adjacent outer end edge 29 by a pair of stud bolts 52. Bolts 52 extend through a flange 53 which extends outwardly from the bottom of a leg section 54 of L-shaped member 51. A triangular-shaped reinforcing flange 55 extends between and is welded to leg section 54 and flange 53.

A second leg section 56 extends outwardly from and generally perpendicular to leg section 54 and terminates in an outwardly, downwardly extending stop member 57. Leg section 56 preferably has an outturned top flange 58 to provide rigidity to leg section 56. Stop member 57 terminates in an outturned stop pad flange 59. A stop pad 60, which is formed of a resilient, shock-absorbing type material, is mounted on the under surface of stop flange 59.

Figure 4:
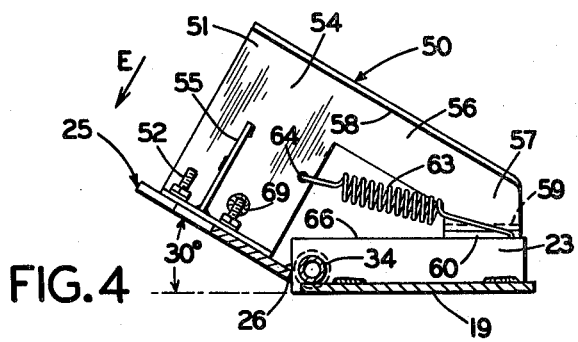
FIG. 4 is a sectional view taken on line 4—4, FIG. 3, showing the treadleplate in its normal unactuated, at-rest position.

A coil spring 63 extends between base 19 and L-shaped member 51 and biases contact plate 25 to its raised, at-rest position of FIG. 4. Spring 63 is formed with a pair of hood ends 64 and 65 which extend through holes formed in leg section 54 and top wall 66 of U-shaped channel 23. Stop pad 60 abuts channel top wall 66 when contact plate 25 is in the at-rest or unactuated position of FIG. 4 to maintain contact plate 25 at a predetermined inclined, rearwardly extending position. Contact plate 25 forms an included obtuse angle with respect to base 19, at an angle of approximately 150°. This angle, however, may vary without affecting the operation of treadleplate 1.

Link assembly 50 further includes a stud rod 68, which has a reduced inner end that extends through a hole formed in leg section 54 and is welded therein by a weld 69. A link housing 70 (FIG. 9) is pivotally mounted on an outer reduced end 71 of rod 68 which extends through a pair of aligned holes 72 formed in housing side walls 73. An enlarged intermediate section 74 of rod 68 spaces link housing 70 from L-shaped member 51. A pair of washers 75 is mounted on outer end 71 of rod 68 adjacent housing walls 73. A snap ring or other device retains housing 70 and washers 75 on the outer end of stud rod 68.

Figure 6:
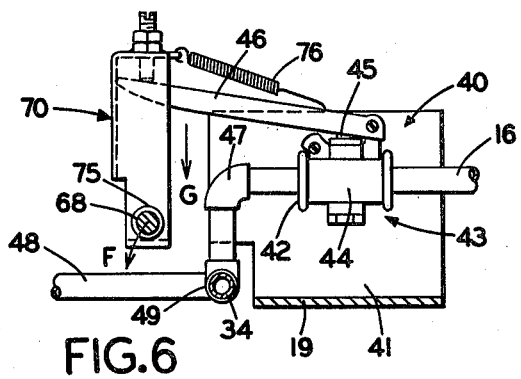
FIG. 6 is a fragmentary sectional view taken on line 6—6, FIG. 3, showing the valve and its actuating lever in an at rest or unactuated position.
Figure 7:
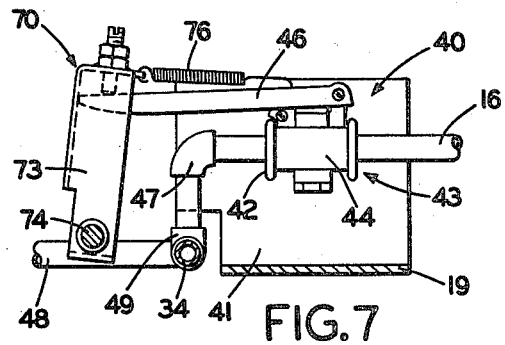
FIG. 7 is a view similar to FIG. 6 showning the valve and its actuating lever in a depressed or actuated position.
Figure 9:
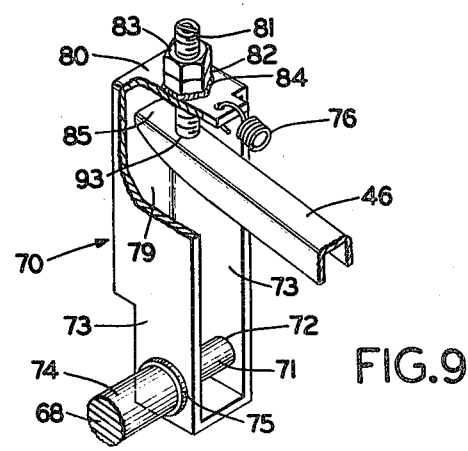
FIG. 9 is a fragmentary perspective view of a portion of the valve actuating link assembly shown in FIGS. 6 and 7.

Link housing 70 includes an upper back wall portion 79 and a top wall 80. A threaded rod or bolt 81 extends through an opening formed in top wall 80 and is adjustably mounted thereon by a pair of internally threaded nuts 82 and 83 with bottom nut 82 being welded at 84 to housing top wall 80. Extended end 85 of valve lever 46 is located within housing 70 and slidably engages housing back wall 79 and abutted against the bottom end of adjusting rod 81, as shown in FIGS. 6, 7 and 9. A spring 76 is connected to and extends between top wall 80 of housing 70 and valve lever 46 to maintain the contact between housing 70 and lever end 85.

In accordance with one of the main features and principles of the invention, the outer edge 27 of contact plate 25 has a stepped configuration formed by a pair of shoulders 87 and 88. Shoulders 87 and 88 form three tire contact zones on plate 25, indicated by numerals 90, 91 and 92. Zones 90, 91 and 92, each have a predetermined length or tire engagement distance, measured from outer edge 27 to inner edge 26, and indicated by letters B, C and D, respectively (FIG. 3). These lengths are taken in a direction longitudinal with respect to the path of a vehicle moving through the carwash. Engagement distances B, C and D progressively decrease from outer end edge 29 toward inner end edge 28 of plate 25.

The operation of treadleplate 1 is described below with reference particularly to FIG. 1. Innermost contact zone 92 of plate 25 will be engaged by the passenger side tire 6a of a vehicle in the compact or sports car class. Plate 25 will pivot downwardly in the direction of Arrow E (FIG. 4), when engaged by moving vehicle tire 6a and will assume the actuated horizontal position of FIG. 5 upon continued movement of tire 6a over length D of zone 92. The downward pivotal movement of plate 25 from the at-rest position of FIG. 4, to the depressed position of FIG. 5 will move link housing 70 from the position of FIG. 6 to that of FIG. 7. Stud rod 68 will travel through an arcuate path, indicated by Arrow F (FIG. 6), due to the rigid mounting of rod 68 on L-shaped member 51. This downward swinging movement of link housing 70 will pivot valve lever 46 downwardly in the direction of Arrow G, through the engagement of lower end 93 of rod 81 with extended end 85 of lever 46. The downward movement of lever 46, in turn, depresses plunger 45 opening valve 40. A predetermined flow rate of a cleaning solution from incoming supply line 16 moves through valve body 44 and into nozzle supply lines 47, 48 and 34 for application through nozzles 13 of spray assemblies 10 and 11 onto the tires of a vehicle.

Figure 5:
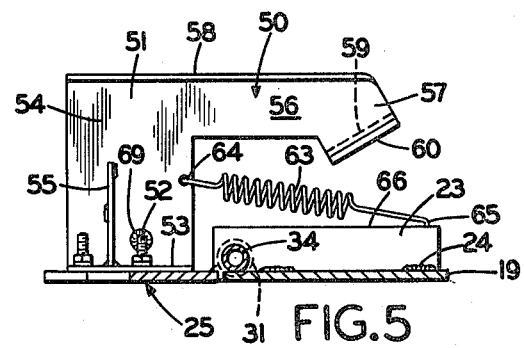
FIG. 5 is a view similar to FIG. 4 showing the treadleplate in a depressed or valve actuating position.

Plate 25 will remain in the depressed or valve actuated position of FIG. 5 for the predetermined amount of time that is required for tire 6a to roll through distance D of contact zone 92. Immediately after passage of tire 6a beyond plate edge 27, spring 63 will pivot contact plate 25 upwardly from the depressed position of FIG. 5 to the inclined at-rest position of FIG. 4. This pivotal upward movement will return valve lever 46 from the valve actuating position of FIG. 7 to the valve closed position of FIG. 6. Thus, by calculating the speed that a vehicle moves through a carwash on conveyor 3, which is constant, and by setting distance D to a predetermined valve the exact time that valve 43 is open or the spray application time is exactly known. It also can be shown by experimentation or experience that a predetermined amount of spray time is required to completely clean the side walls of a particular size tire such as represented by tire 6a. Therefore, in the construction of contact plate 25, distance D will be known and plate 25 will be formed accordingly.

For intermediate size vehicles, which will have a known track Y (FIG. 1), contact zone 91 will be formed with a predetermined tire contact length C. Valve 43 will be open the required time for complete cleaning of an intermediate tire size 7a, as tire 7a rolls over contact zone 91 of plate 25. Likewise, passenger side tire 8a of larger vehicles having a track Z will contact and roll across contact zone 90 of plate 25 throughout distance B. Since the speed of conveyor 3 remains constant regardless of the size of the vehicle being cleaned, it will take a correspondingly longer period of time for tire 8a to 8a to roll through distance B of contact zone 90 than tires 6a and 7a through zones 92 and 91, respectively. This will result in a longer open valve condition, thereby permitting a longer spray application time for the larger tire side wall area of the tire 8a.

The lengths of shoulders 87 and 88, which in turn determines the tire contact distances B, C and D, will vary depending upon the particular conveyor speed of the carwash in which treadleplate construction 1 is to be installed. The mounting location of treadleplate 1 on carwash floor 2 is critical to insure that tire 6a of the smaller class vehicles will never engage contact zones 91 and that tire 7a of the intermediate class vehicles will always engage a portion of contact zone 91 without engaging any portion of contact zone 90. Likewise, tire 8a of the larger class vehicles must always engage a portion of contact zone 90. Most conveyors 3 usually will permit only a slight transverse movement of the vehicles within the conveyor once captured by roller 4 or other vehicle retaining means. This will enable treadleplate 1 to be positioned accurately with respect to the outer passenger side tire, eliminating engagement of the wrong contact zone.

Another feature of the invention is the manual adjustment of the opening of valve 43 by movement of threaded rod 81 into or out of link housing 70. A manual downward movement of rod end 93 will depress lever 46 a relatively small distance without opening the valve. This permits plunger 45 to be depressed a greater distance into the valve body and consequently achieve a greater valve opening when actuated to the position of FIG. 7. Correspondingly, a manual upward adjusted position of rod 81 will result in a smaller valve opening when lever 46 is in a depressed valve actuated position. This setting enables the volume of spray solution which flows through the valve to be accurately controlled, again improving the economies achieved by the saving of cleaning solution by use of treadleplate 1.

Treadleplate 1 is formed of rigid metal plates or metal sheets, preferably having a galvanized protective coating. These plates can be assembled easily and economically by welding, bolting or other attachment means and procedures to form a sturdy construction. Also, a standard "on-off" control valve 43 can be used, as in existing treadleplates of the type which use a uniform contact plate configuration. Furthermore, treadleplate 1 can replace existing nonstepped treadleplates already in use without any material alterations to the existing carwash equipment. Treadleplate 1 can be modified for use in various carwash installations merely by replacing contact plate 25 with a contact plate which has different contact zone lengths for carwashes having different conveyor speeds or other operating conditions. Treadleplate 1 has only a relatively few movable parts, which can withstand the harsh environment in which they are located without requiring considerable maintenance for their efficient operation.

Although the relative lengths or depths of shoulders 87 and 88 are relatively small with respect to the longitudinal lengths of contact zones 90, 91 and 92, resulting in contact plate depression time differences and valve actuation differences of a second or two between each contact zone. This in turn will result in a chemical solution savings of approximately an ounce or more per small class vehicle. However, this savings will be considerable in a period of a year,, during which time a usual carwash may clean between 50,000 and 100,000 vehicles. Likewise, vehicles having larger tire sizes will be more efficiently cleaned than heretofore done with prior cleaning systems, resulting in satisfied customers.

One example of the size of treadleplate 1 is as follows: Base 19 and plate 25 are formed of seven gauge zinc-plated steel with base 19 having a length of approximately forty-four inches and a depth of five and one-half inches, and in which contact plate 25 has a length of forty-one inches. Distances B, C and D of plate 25 are approximately four inches, three inches and two inches, respectively. The transverse lengths of zones 92, 91 and 90 will be twenty-six, nine and six inches, respectively.

Accordingly, the improved treadleplate construction 1 provides a construction which is extremely simple, relatively inexpensive and maintenance free, durable in operation and use, which provides automatically for a positive spray application of a tire cleaning solution for a predetermined time period, which spray time period and amount of solution used is in direct relationship to the particular tire size being cleaned, and provides economies in use of the cleaning solution and more efficient cleaning of large tire sizes heretofore not believed possible with known prior art treadleplate constructions.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown or described.

Having now described the features, discoveries and principles of the invention, the manner in which the apparatus for use in cleaning vehicle tires is constructed, assembled and operated, the characteristics of the new construction, and the advantageous, new and useful results obtained; the new and useful structures, devices, elements, arrangements, parts, and combinations are set forth in the appended claims.

I claim:

1. An apparatus for cleaning the sidewalls of tires of passing vehicles in an automatic carwash system of the type having fluid spray nozzle means for spraying the sidewalls of the passing vehicle tires with a cleaning fluid, a supply of cleaning fluid communicating with the nozzle means, valve means for controlling the flow of cleaning fluid to the nozzle means, and treadleplate means mounted in the travel path of at least one of the vehicle tires and having a movably mounted contact plate communicating with the valve means for actuating said valve means when the contact plate is depressed by a passing vehicle tire, wherein the improvement includes a stepped outer end formed on the contact plate providing a plurality of tire contact zones of different lengths for regulating the activation time of the valve means depending upon the particular contact zone contacted by a vehicle tire.

2. The apparatus defined in claim 1 in which the treadleplate means includes a base plate and pivot means pivotally mounting the contact plate on said base plate for movement of the contact plate between an at-rest position and a depressed valve actuating position.

3. The apparatus defined in claim 2 in which the pivot means includes a hollow pipe; and in which said pipe provides a portion of a cleaning fluid supply line to one of the spray nozzle means.

4. The apparatus defined in claim 2 in which the valve means includes a valve mounted on the base plate, said valve having an actuating lever, and link means mounted on the contact plate and engageable with the valve lever for operating said valve when the contact plate is pivoted between at-rest and depressed positions.

5. The apparatus defined in claim 4 in which the link means includes rod means mounted on the contact plate and extending outwardly therefrom; and link housing means pivotally mounted on an extended end of the rod means and engageable with the valve lever for movement of said valve lever.

6. The apparatus defined in claim 5 in which the valve lever includes an extended end movably mounted within the link housing means; and in which lever adjusting means is mounted on the link housing means and engageable with the extended end of the valve lever to adjust the valve setting.

7. The apparatus defined in claim 2 in which the contact plate forms an included obtuse angle with the base plate when in at-rest position.

8. The apparatus defined in claim 1 in which the stepped outer end of the contact plate extends transversely with respect to the vehicle travel path; and in which the tire contact zones extend longitudinally with respect to the vehicle travel path.

9. The apparatus defined in claim 1 in which the contact plate is formed with three integrally joined contact zones.

10. A treadleplate construction for use in a carwash for actuating a valve which controls the flow of a cleaning solution to one or more spray nozzles for cleaning vehicle tires including:
(a) base plate means adapted to be mounted in the path of a vehicle moving through the carwash;
(b) contact plate means pivotally mounted on the base plate means and movable from a raised position to a depressed position upon contact by a vehicle tire as the vehicle moves through the carwash;
(c) spring means biasing the contact plate means from the depressed position toward the raised position;
(d) the contact plate means having a plurality of contact zones of varying lengths adapted to be engaged by a vehicle tire; and
(e) lever means operatively engageable with the contact plate means, said lever means adapted to operate a spray nozzle valve when the contact plate is moved toward depressed position to permit a flow of cleaning solution to a spray nozzle for application to a vehicle tire for a predetermined amount of time depending upon the particular contact zone engaged by the vehicle tire.

11. The construction defined in claim 10 in which the contact plate means forms an included obtuse angle with the base plate means when in raised position.

12. The construction defined in claim 10 in which the contact plate means and base plate means are formed with aligned socket means; in which pipe means is mounted in the socket means to form a pivot for the contact plate means; and in which the pipe means forms a portion of a cleaning fluid supply line to a spray nozzle.

13. The construction defined in claim 10 in which the contact plate means has a generally rectangular configuration defined by spaced inner and outer edges and a pair of spaced end edges; in which the outer edge is formed with a plurality of stepped sections forming the contact zones; and in which the contact zones decrease in length measured between the outer and inner edges, progressively from one of the end edges toward the other of said end edges.

14. The construction defined in claim 10 in which the lever means includes outwardly extending rod means mounted on the contact plate means and movable with said contact plate means, and housing means pivotally mounted on the rod means and adapted to engage a spray nozzle control valve for actuation of said valve upon the contact plate means moving between raised and depressed positions.

15. The construction defined in claim 14 in which second spring means bias the housing means toward engagement with a nozzle control valve.

16. The construction defined in claim 10 in which stop means is mounted on the contact plate means; and in which said stop means is engageable with the base plate means when the contact plate means is in raised position.

17. The construction defined in claim 16 in which the stop means includes resilient shock absorbing pad means.

18. The construction defined in claim 10 in which the contact plate means is a single piece of sheet metal plate with the contact zones being integral with respect to each other.

* * * * *